Sept. 16, 1969   C. D. RUSSELL   3,466,941
MECHANICALLY OPERATED REMOTE CONTROL OUTSIDE MIRROR DEVICE
Filed Dec. 1, 1966
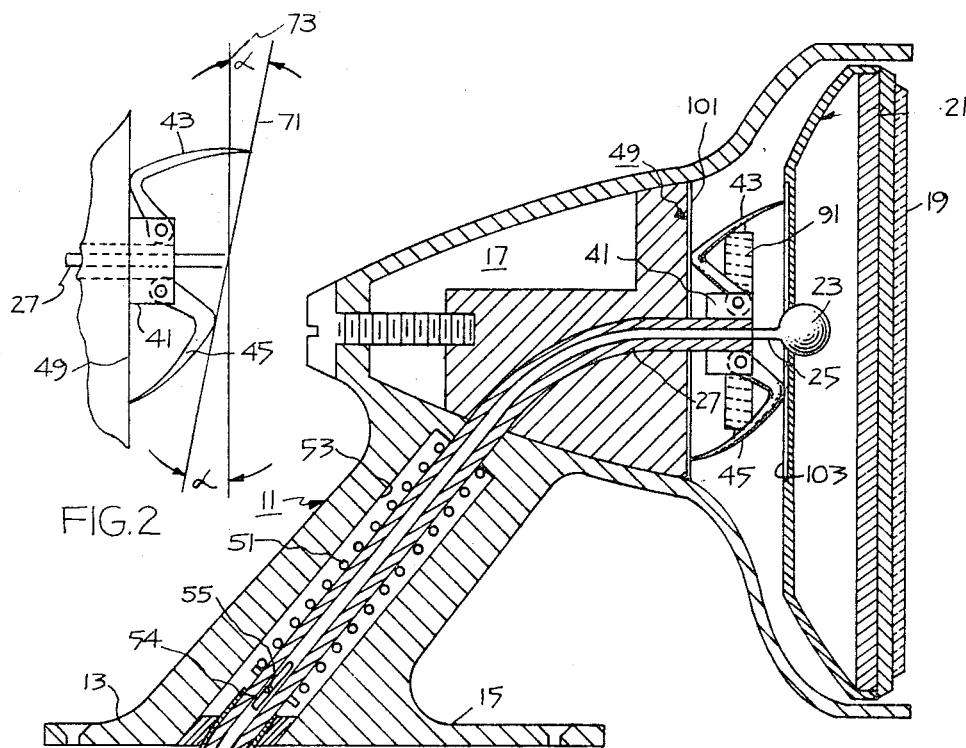
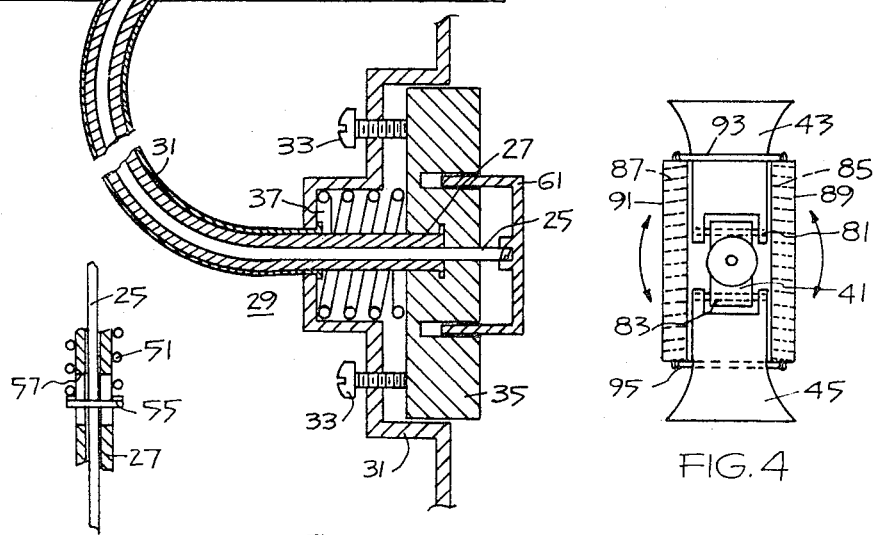
INVENTOR.
Carl D. Russell

United States Patent Office 3,466,941
Patented Sept. 16, 1969

3,466,941
MECHANICALLY OPERATED REMOTE CONTROL
OUTSIDE MIRROR DEVICE
Carl D. Russell, 1209 Walnut St.,
Muskogee, Okla. 74401
Filed Dec. 1, 1966, Ser. No. 598,331
Int. Cl. F16c 1/20; G02b 17/00
U.S. Cl. 74—501
10 Claims

ABSTRACT OF THE DISCLOSURE

This invention relates to apparatus for positioning and locking a mirror by holding its case in a static orientation relative to a vehicle against wind and other vibratory influences until an angular change is desired. It comprises a housing for pivotally supporting a mirror case with the housing including a wall spaced from the case. Pivotal means are disposed between the wall and case for changing the position of the case relative to the wall. Also included are means for normally urging the case against the pivotal means to hold the latter against the wall. At a remote location usually within the vehicle there is provided means for releasing the normally urging means and additional means for pivoting the pivotal means during the release to provide for substantially universal orientation of the mirror for use by the vehicular driver.

---

The present invention relates to a mechanical assembly capable of remotely positioning an element, such as a rear-view mirror, for a vehicle. The type control manifested will enable tilting, angling, and full adjustment therebetween for any position the driver would require of a rear view mirror. Tilting encompasses adjusting the mirror relative to a vertical plane, an angling covers adjustment of side to side movement of the mirror; adjustment therebetween encompasses a component of both vertical and horizontal adjustment.

A feature of the invention resides in the provision of a locking arrangement, for locking the mirror in the desired position, in order that the mirror element will not be affected by wind, vibration, or other factors which normally tend to change a vehicular mirror orientation, either abruptly or gradually.

A further feature of the invention resides in a unique, inexpensive construction for the means producing the tilting or angling (which means also serve as the locking mechanism, once the desired position is attained).

Since both tilt and pan control of the mirror element is available, the device is effective for most so-called day-night type mirrors, as well as for full adjustment of conventional side-mounted mirrors, to accommodate the particular driver and position of the vehicle front seat.

Use may be made of fairly standard components to incorporate the mirror in external mirror housings. The well-known flexible cable of Bowden wire type may be employed as the mirror retaining mechanism, which serves to hold the mirror latched in the desired position, and also serves to free the mirror from the latched condition in order that its position may be re-adjusted.

The orientating means comprise members having short and long reaches respectively, extending outwardly of the hub and pivotally mounted thereto. This structure is simply illustrated in the form of a block or hub fitted to an outer sheath of the Bowden wire and carrying a pair of oppositely spaced spider legs. These spider legs are generally of approximately right-angle configuration and are pivotally attached to the hub or block in opposite orientation. The short reach of one leg contacts the mirror and the long reach a wall of the housing; whereas the short reach of the other leg contacts the wall of the housing and the long reach the mirror case. Thus, the spider legs are oppositely connected to the block in order that movement of the block in one direction; i.e., toward the mirror case, causes the positioning members to exert a tilting force in one direction, whereas movement of the block away from the mirror case causes the mirror case to tilt in the opposite direction.

Provision is made for rotating the sheath and positioning or orienting members; such that the positioning members may angle the mirror in the same manner as they tilted the mirror. It may be appreciated then that the positioning members may occupy any position around a 360° circle so as to tilt or angle the mirror to any desired orientation.

A button or release means is provided with in the vehicle which permits the spring tension normally holding the mirror case against the positioning members in a fixed position to be released. The turning of a knob, associated with the outer sheath, operates the positioning members to move the mirror case as desired, the resilient means maintaining the assembly in latched condition upon release of the button.

Additionally, the mirror is locked in the desired position by the positioning members bearing against or into relatively soft materials coated or affixed to the mirror case and the wall of the housing, such that the spider legs bite into the soft material and the resilient forces maintain the fixed positioning until the controls release the assembly for further positioning.

With the foregoing in mind, it is an object of this invention to provide an assembly for remotely positioning an element locking the same in the desired position.

It is a further object of the invention to provide such an assembly for tilting and angling an outside vehicle mirror from a remote control station within the vehicle.

It is a further object of the invention to provide a unique positioning element capable of translating axial movement back and forth along the axis through the mirror into angular movement of the plane of the mirror relative to the axis, with control of angling and tilting or any combination thereof, throughout 360° around the axis.

A still further feature of the invention is the provision of means for automatically locking the mirror in the desired position and unlocking the mirror for change of position.

The invention will be further described in detail in connection with the illustration of a preferred embodiment thereof, as shown in the drawings wherein:

FIG. 1 is a cross-sectional view of a mirror and mounting assembly therefor with remote control for positioning the mirror;

FIG. 2 is a partial view, in elevation, showing the positioning or orienting means for the mirror element;

FIG. 3 is a detailed view, in cross-section, of a pin and slots for cooperation with resilient means; and FIG. 4 is a front view of the positioning or orienting means and mirror connector ball with mirror and case removed.

Referrng now to the drawings and particularly to FIG. 1, there is shown a mirror assembly comprising a housing 11 having flanges 13 and 15 for attachment to a surface of a vehicle and a tapered or semi-cylindrical upper portion 17 for the mirror element 19. The mirror element 19 may comprise a circular or rectangular mirror held in case 21 and freely supported for tilting or angling movement within the mouth of the portion 17.

The support of 19 is provided by or from ball 23, preferably universally mounting case 21, and carried by flexible wire 25 in sheath 27. The wire 25 and sheath 27 may comprise a conventional Bowden wire arrangement so long as the sheath 27 may rotate relative to wire 25.

The wire 25 and sheath 27 extend to a remote control station generally designated at 29, which in the case of vehicular attachment, would be in the interior of the vehicle, a protective covering 31 for sheath 27 being included between station 29 and the housing 11.

A frame 31 is fixed to the vehicle and carries set screws 33 which space position control knob 35 from support 31. A spring 37 normally urges the position control knob 35 in the direction away from set screws 33 (to the right as seen in FIG. 1). However, the right hand end of sheath 27 is embedded or otherwise attached to position control knob 35 and is affixed to block or hub 41 within housing portion 17 at the other end.

The block or hub 41, in combination with the spider legs or arms 43 and 45, provides a positioning means for case 21 with spider legs 43 and 45 extending across the space between a wall 49 of upper housing 17 and the exterior of case 21, thus temperorily fixing the position of block 41, such that the position control knob 35 cannot move away from any set screw 33 until released because the mirror case 21 is biased in the direction of wall 49 by spring 51 located in recess 53 of the housing 17. This spring bears against a crosspeg or pin 55 extending to either side of wire 25 and through slots 54 in the wire casing to bias the ball 23 to urge the case 21 in the direction of wall 49.

The release mechanism is under the control of push button 61. Movement of the push button 61 to the left in FIG. 1 causes wire 25 to move ball 23 to the right, thereby releasing the forces holding the assembly in static condition. Instantly, spring 37 urges position control knob 35 to the right, away from set screws 33, thus pulling casing or sheath 27. This in turn pulls block or hub 41 to the left, and causes spider leg 43 to pivot to the right in a clockwise direction (as shown in FIG. 2) thereby tilting the case 21 downwardly.

FIG. 2 shows the full released position, wherein block 41 has been moved completely (by sheath 27) to its left hand position, against wall 49 and the mirror has been tilted to one extreme position, the plane of the mirror being indicated by line 71, the angle of tilt by the Greek symbol for alpha, and the set screw or normal position plane of the mirror at 73.

Return of the mirror case 21 from the position of plane 71 to the set position of plane 73 is effected manually by moving the push control knob 35 to the left as far as set screws 33, either directly with the accompanying release of button 61, or through button 61 to return block 41 to the position shown in FIG. 1.

In actual use, the operator normally would hold two or three fingers against position control knob 35 and depress release button 61, moving this hand to and fro until the mirror assumes the proper position at which point contact with release button 61 would be removed and the mechanism would lock at that position.

In FIG. 4, the spider legs 43 and 45 are seen in front elevation. Leg 43 is pivotally connected to block or hub 41 by pin 81 and spider leg 45 is pivotally assembled thereto by pin 83. A pair of springs 85 and 87 are contained respectively in containers 89 and 91. Cross members 93 and 95 connect the springs to the spider legs, such that the springs tend to draw the legs together but the containers limit the action to fix the spacing between the spider legs.

The locking feature of the invention resides in the fact that the tip ends of the spider legs 43 and 45 (and, if desired, the knees thereof) are sharpened (or serrated) to bear into the surface which they contact. Preferably the wall 49 is covered with a soft plastic, rubber, or other pliable material 101, as is also true at 103 of the surface of mirror case 101, whereby the mirror case is automatically locked in each position assumed.

This is particularly desirable when it is realized that the spider mechanism or angular means comprising legs 43 and 45 may be rotated through 360° in order to tilt the mirror in the vertical plane, horizontal plane, or anywhere inbetween.

While the use of the set screws 33 has been illustrated to fix the normal or return position of mirror 19 to the vertical plane 73, it will nevertheless be appreciated that the normal or return position can be set to either side of the vertical (or hozriontal). However, the mirror can only be tilted forwardly and downwardly at the top (in a clockwise direction and back) with the mechanism set in the position with spider arm 43 above spider arm 45. If it is desired, for example, to observe the sky, position knob 35 is simply rotated 180° and the case 21 may then be tilted to a limit counter-clockwise position and returned, spider leg 43 driving the lower surface of case 21.

It should be apparent now that the spider mechanism may be operative using other elements. For example, triangular members having short and long reaches could be substituted for spider legs 43 and 45, as is also the case with wedges, hyperbolically-shaped elements or the like. Similarly, a plurality of elements, such as the spider legs or substitutes therefor may be employed. The provision of more than two elements enables tilting and angling of the mirror 21 simultaneously and in a direction determined by the location and arrangement of the legs.

What is claimed is:

1. Apparatus for positioning and locking a mirror by holding its case comprising in combination: a housing for the mirror case; said housing including a wall spaced from the case; pivotal means disposed between the wall and case for changing the position of the case relative to the wall; means normally urging the case against the pivotal means; means for releasing said normally urging means; and means for pivoting said pivotal means during said release.

2. The apparatus of claim 1 wherein said pivotal means comprises a plurality of angular means and a common support therefor; said angular means being pivotally connected to said common support.

3. The apparatus of claim 2 wherein each of said angular means comprises arms having a short reach and a long reach.

4. The apparatus of claim 3 wherein at least one of said wall and case further comprises pliable material affixed thereto for receiving at least an end of one of said reaches of each arm.

5. The apparatus of claim 4 wherein the means normally urging the case comprises a flexible wire and ball with the ball universally engaging the case and the flexible wire extending via the housing to a remote location; the means for pivoting comprise movable sheath about said wire connected to said common support and extending to said remote location; said means for releasing said normally urging means comprising a button connected to said flexible wire at the remote location.

6. Apparatus for remotely positioning a mirror retained in a case comprising in combination, a housing for the mirror case; a wall in said housing spaced from the mirror with the case of the mirror being substantially parallel to the wall when the mirror is in a normal position; angular means extending between the wall and the mirror; means connecting said angular means for pivotal movement relative to each other; said angular means being of conjugate configuration in respect to the contacts made with said wall and case when the case is in the normal position; means resiliently retaining the case against the angular means and the angular means against the wall; means supporting the means connecting the angular means; means biasing the supporting means in the direction of the wall; and means for at least partly releasing the resilient means maintaining the mirror case to permit the biasing means effective at the connecting means via the supporting means to move the connecting means in the direction of the wall causing the angular means to change the orientation of the mirror.

7. The apparatus of claim 6 wherein the biasing means for moving the connecting means comprises a fixed frame, the supporting means comprises a sheath, the biasing means further comprises a positioning knob connected to the sheath, and said biasing means comprises a spring disposed between the frame and the knob.

8. The apparatus of claim 7 further including means for fixing the normal position of the mirror comprising adjustable means spacing the positioning knob from the frame to locate the connecting means at a given location whereby the angular means fix the position of the mirror case against the resiliency of the means urging the mirror in the direction of the wall.

9. The apparatus of claim 8 wherein the angular means comprise spider legs each having a relatively short reach in the pivotal connection with the connecting means and each having a terminal long reach and wherein the junctions of said reaches respectively bear against the wall and the case with the terminal tips respectively bearing against the case and the wall.

10. The apparatus of claim 9 wherein the wall and the case are coated with pliable material and at least the tips of the terminal reaches of the angular means define sharp edges for biting into the coating material.

References Cited

UNITED STATES PATENTS

| 1,709,039 | 4/1929  | Poirmeur    | 74—502  |
| 2,483,289 | 9/1949  | Martin      | 350—307 |
| 2,855,825 | 10/1958 | Feder       | 74—501  |
| 3,229,082 | 1/1966  | Barron.     |         |
| 3,286,545 | 11/1966 | Malachowski | 74—501  |
| 3,352,524 | 11/1967 | Rossi       | 74—501  |

FOREIGN PATENTS

| 128,448 | 6/1919 | Great Britain. |

FRED C. MATTERN, JR., Primary Examiner

CAROLYN F. GREEN, Assistant Examiner

U.S. Cl. X.R.

350—279